(12) United States Patent  
Fujita et al.

(10) Patent No.: US 9,238,408 B2  
(45) Date of Patent: Jan. 19, 2016

(54) DISPLAY DEVICE

(71) Applicant: ALPINE ELECTRONICS, INC., Tokyo (JP)

(72) Inventors: Motoki Fujita, Iwaki (JP); Shinobu Kida, Iwaki (JP); Shotaro Omine, Iwaki (JP); Koki Yaehata, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 182 days.

(21) Appl. No.: 14/045,508

(22) Filed: Oct. 3, 2013

(65) Prior Publication Data

US 2014/0125914 A1    May 8, 2014

(30) Foreign Application Priority Data

Nov. 6, 2012 (JP) ................. 2012-244477

(51) Int. Cl.
*G02F 1/1333* (2006.01)
*B60K 35/00* (2006.01)

(52) U.S. Cl.
CPC ...................... *B60K 35/00* (2013.01)

(58) Field of Classification Search
None
See application file for complete search history.

(56) References Cited

U.S. PATENT DOCUMENTS

| | | | |
|---|---|---|---|
| 6,614,656 B1* | 9/2003 | Huang | 361/690 |
| 8,894,477 B2* | 11/2014 | Lee | H05K 7/20972 361/695 |
| 2005/0140843 A1* | 6/2005 | Shimizu | 349/58 |
| 2009/0096945 A1* | 4/2009 | Su et al. | 349/38 |
| 2009/0147175 A1* | 6/2009 | Tsumura et al. | 349/58 |
| 2010/0020263 A1* | 1/2010 | Murao | G02F 1/133526 349/62 |
| 2011/0149194 A1* | 6/2011 | Nakano | 349/58 |
| 2011/0149196 A1* | 6/2011 | Tanaka | 349/58 |
| 2011/0167845 A1* | 7/2011 | Lee | H05K 7/20972 62/89 |
| 2012/0012300 A1* | 1/2012 | Dunn et al. | 165/287 |
| 2012/0105790 A1* | 5/2012 | Hubbard | 349/161 |
| 2012/0106081 A1* | 5/2012 | Hubbard et al. | 361/696 |

FOREIGN PATENT DOCUMENTS

JP    A1 2011-133783    7/2011

* cited by examiner

*Primary Examiner* — Richard Kim
*Assistant Examiner* — Ryan Crockett
(74) *Attorney, Agent, or Firm* — Brinks Gilson & Lione

(57) ABSTRACT

In a display device to be mounted in a vehicle, a space is secured between a cover with which a first opening of a case main body is sealed and a liquid crystal panel of a display unit mounted on the backside of the case main body, ventilation openings (spaces around protrusions and through holes) that communicate with an external space are formed in portions of a casing, which is a component member of the display unit, except for the front surface of the casing, and protruding portions each partially supporting the outer edge portion of the front surface of the liquid crystal panel are formed on the inner surface of the front wall of the casing. Thus, a long and complicated air flow path is secured around the liquid crystal panel by the protruding portions, and the space and the external space communicates with each other via the path.

20 Claims, 13 Drawing Sheets

DISPLAY DEVICE

RELATED APPLICATION

The present application claims priority to Japanese Patent Application Number 2012-244477, filed Nov. 6, 2012, the entirety of which is hereby incorporated by reference.

BACKGROUND

1. Field of the Invention

The present invention relates to a display device in which a display screen of a display panel mounted in a case main body is covered with a transparent cover, and more particularly to a display device in which anti-dust and anti-fog measures are taken for preventing dust and the like from entering a space defined between the display panel and the cover and for preventing occurrence of fogging due to condensation.

2. Description of the Related Art

In a display device that is to be mounted in a vehicle and that is to be arranged in a cluster panel or the like provided in a vehicle cabin, a display unit is mounted on the backside of a case main body having an opening, and a display panel (a liquid crystal panel) that is a component member of the display unit is exposed through the opening of the case main body. However, the opening of the case main body is usually covered with a transparent cover in such a manner as to prevent a display screen of the display panel from getting damaged. In this case, if a large space is not secured between the cover and the display screen, when the cover is pressed by a finger of an occupant or the like and is warped, the deformation of the cover may directly affect the display panel, and the display screen can be damaged. Thus, a reasonably large space is secured between the cover and the display screen.

In such a display device to be mounted in a vehicle, in the case where the space is not hermetically sealed and is in an open state, foreign objects such as dust are likely to enter the space from the outside. In contrast, in a state where the space is completely hermetically sealed, water vapor that is present in the space is likely to condense on the cover and the display screen in a low temperature environment, and thus, a problem occurs in that the display screen becomes fogged and difficult to see. Therefore, in the related art, there has been proposed a display device, which is to be mounted in a vehicle, in which a plurality of air holes are formed in an outer circumferential portion of a cover, a frame-shaped dustproof sheet that is breathable is attached to the outer circumferential portion of the cover in such a manner as to cover the air holes, and a display unit is mounted on the backside of a case main body in such a manner that a multilayer body formed of the cover and the dustproof sheet is sandwiched between the display unit and the case main body, so that the air holes of the cover overlapping with the space are in communication with an external space via recesses of the case main body (see Japanese Unexamined Patent Application Publication No. 2011-133783). In this example of the related art, the space defined between the cover and the display unit is surrounded by the frame-shaped dustproof sheet, and thus, the dustproof sheet can prevent dust and the like from entering the space. In addition, since the air holes of the cover are in communication with the external space via the recesses of the case main body, condensation is not likely to occur in the space, and thus, a good anti-fogging effect can be expected.

However, in the display device to be mounted in a vehicle of the related art disclosed in Japanese Unexamined Patent Application Publication No. 2011-133783, the dustproof sheet needs to be formed by punching a piece of nonwoven fabric or the like into a frame-like shape, and after that, the dustproof sheet needs to be attached to the outer circumferential portion of the cover using a double-sided adhesive tape or the like. Thus, the component costs including the costs of the dustproof sheet and the double-sided adhesive tape significantly increase, and as a result, there has been a problem in that the efficiency of assembly work of attaching the dustproof sheet to the cover is poor. In addition, since the display unit is mounted on the backside of the case main body in such a manner that the display unit is pressed into contact with the rear surface of the dustproof sheet, so that the space is secured between the rear surface of the cover and the display screen of the display panel, the depth dimension of the space cannot be set sufficiently large, and there is a possibility that the display screen gets damaged due to the deflection deformation of the cover.

SUMMARY

The present invention has been made in view of the above situation in the related art, and it is an object of embodiments of the present invention to provide a display device capable of preventing, with certainty, dust and the like from entering a space defined between a display panel and a cover and occurrence of fogging due to condensation with a simple configuration.

In order to achieve one or more of the above objects, a display device according to one aspect of embodiments of the present invention includes a case main body in which a first opening is formed, a cover that is transparent and that is attached to the case main body in such a manner as to seal the first opening, and a display unit that is mounted on a backside of the case main body, the display unit including a rectangular display panel in which a display area of a front surface of the display panel faces the cover with a space interposed between the display area and the cover and a casing in which the display panel is accommodated and in which a second opening through which the display area is exposed is formed. A ventilation opening that is in communication with an external space is formed in a portion of the casing except for a front surface of the casing, a plurality of protruding portions each of which partially supports an outer edge portion of the front surface of the display panel are formed on an inner surface of a front wall of the casing, and an outer surface of the front wall of the casing is in close contact with the backside of the case main body along the periphery of the second opening.

In the display device configured as described above, the space is secured between the cover with which the first opening of the case main body is sealed and the display panel of the display unit, which is mounted on the backside of the case main body, the ventilation opening, which is in communication with the external space, is formed in the portion of the casing of the display unit except for the front surface of the casing, and the plurality of protruding portions, each of which partially supports the outer edge portion of the front surface of the display panel, are formed on the inner surface of the front wall of the casing. Thus, the space and the external space are in communication with each other via a long and complicated air flow path extending from the front of the display panel to the periphery of the display panel. Therefore, dust and the like can be prevented with certainty from entering the space without adding a separate member such as a dustproof sheet, and air flows smoothly between the external space and the space, so that a good anti-fogging effect can be realized.

In the above-described configuration, it is preferable that an elastic member that causes the outer edge portion of the front surface of the display panel to be pressed into contact with the protruding portions be arranged in the casing because in this case, the display panel is accommodated in the casing without rattling, and thus, a noise reduction can be achieved.

In the above-described configuration, it is preferable that a protrusion that is in contact with a side end surface of the display panel be formed on an inner surface of a side wall of the casing and that a plurality of protrusions that are in contact with a lower end surface of the display panel be formed on an inner surface of a bottom wall of the casing because in this case, an air flow path is secured not only in the outer edge portion of the front surface of the display panel, but also around the periphery of the display panel, and thus, the air can flow more smoothly between the external space and the space.

In this case, if an elastic member that causes the side end surface and the lower end surface of the display panel to be pressed into contact with the corresponding protrusions is arranged in the casing, rattling of the display panel can be prevented with more certainty.

In the above-described configuration, it is preferable that the casing include a front frame body that includes a surrounding wall projecting rearward from the periphery of the front wall having the second opening and a rear frame body that closes a rear end opening of the front frame body and that the front frame body and the rear frame body be joined and integrated with each other with the display panel sandwiched between the front frame body and the rear frame body.

In this case, if the ventilation opening is formed at a position at which the front frame body and the rear frame body are joined with each other, the ventilation opening can be formed at the position at which the front frame body and the rear frame body are joined with each other when the front frame body and the rear frame body are integrated with each other.

In this case, if the rear frame body includes an engagement wall that is fitted to the surrounding wall of the front frame body, and a protrusion that defines the ventilation opening is formed on at least one of the engagement wall and the surrounding wall of the front frame body, a space having a size equivalent to the height of the protrusion is formed at the position at which the front frame body and the rear frame body are joined with each other by fitting the engagement wall of the rear frame body into the surrounding wall of the front frame body, and thus, the space can be utilized as the ventilation opening. In particular, it is preferable that each of the front frame body and the rear frame body be a sheet-metal bracket that is made by bending a metal plate because in this case, the front frame body and the rear frame body can be manufactured at low cost.

In the above-described configuration, the outer edge portion of the front surface of the display panel is to be point-supported by the protruding portions, and it is preferable that the protruding portions be formed at three positions surrounding the second opening of the front frame body and that the outer edge portion of the front surface of the display panel be supported at three points by the protruding portions because in this case, even if a torsional stress is applied to the front frame body and the rear frame body, the flatness of a virtual plane defined by three points that are the protruding portions is maintained, and thus, occurrence of deformation of the display panel can be prevented with certainty.

In this case, a liquid crystal panel employing a twisted nematic (TN) method or a vertical alignment (VA) method may be used as the display panel. However, it is particularly effective to use a liquid crystal panel that employs an in-plane switching (IPS) method and has a large viewing angle and small chromaticity changes and color tone changes. In other words, since the IPS method is a driving method of controlling the light intensity of a backlight by rotating liquid crystal molecules that are horizontally laid, luminance unevenness (black unevenness) of a backlight is generated by a slight twisting force. However, occurrence of luminance unevenness can be prevented by supporting an outer edge portion of the front surface of the liquid crystal panel employing the IPS method at three points. Therefore, in the case where the casing in which the liquid crystal panel employing the IPS method is to be accommodated is formed of an assembled body formed of the front frame body and the rear frame body, it is not necessary to manufacture the front frame body and the rear frame body out of a material having high rigidity (e.g., die-cast aluminum, a hard resin, or the like), and the front frame body and the rear frame body each of which is made of an inexpensive and lightweight sheet metal can be used.

In the display device according to one aspect of embodiments of the present invention, the space is secured between the cover with which the first opening of the case main body is sealed and the display panel of the display unit that is mounted on the backside of the case main body, the ventilation opening that is in communication with the external space is formed in the portion of the casing of the display unit except for the front surface of the casing, and the plurality of protruding portions each of which partially supports the outer edge portion of the front surface of the display panel are formed on the inner surface of the front wall of the casing. Thus, the space and the external space are in communication with each other via a long and complicated air flow path extending from the front surface of the display panel to the periphery of the display panel. Therefore, dust and the like can be prevented with certainty from entering the space without adding a separate member such as a dustproof sheet, and the air flows smoothly between the external space and the space, so that a good anti-fogging effect can be realized.

DETAILED DESCRIPTION OF THE PREFERRED EMBODIMENTS

Figure 1:
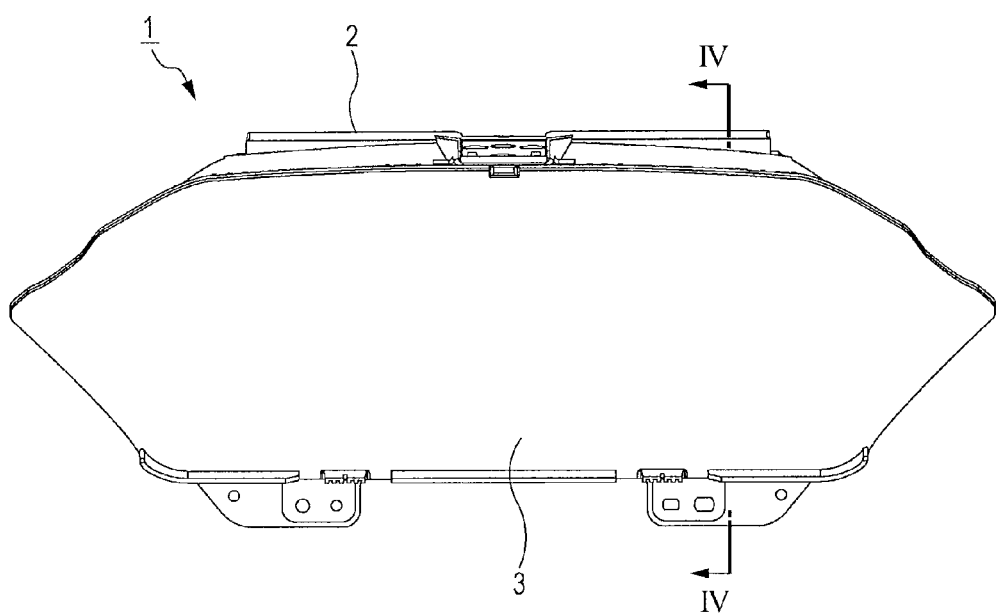
FIG. 1 is a front view of a display device to be mounted in a vehicle according to an embodiment of the present invention.
Figure 2:
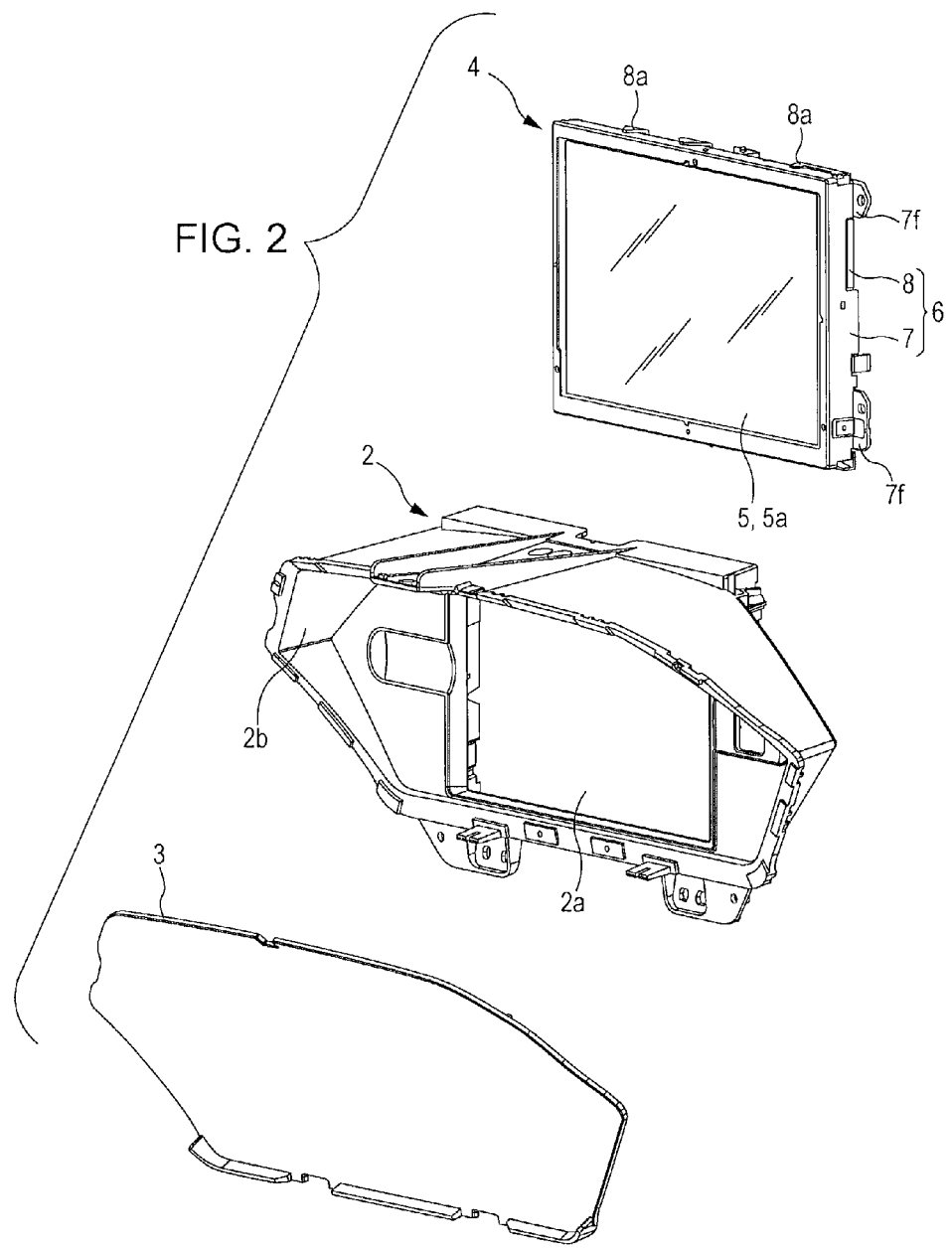
FIG. 2 is an exploded perspective view of the display device as seen from the front.
Figure 3:
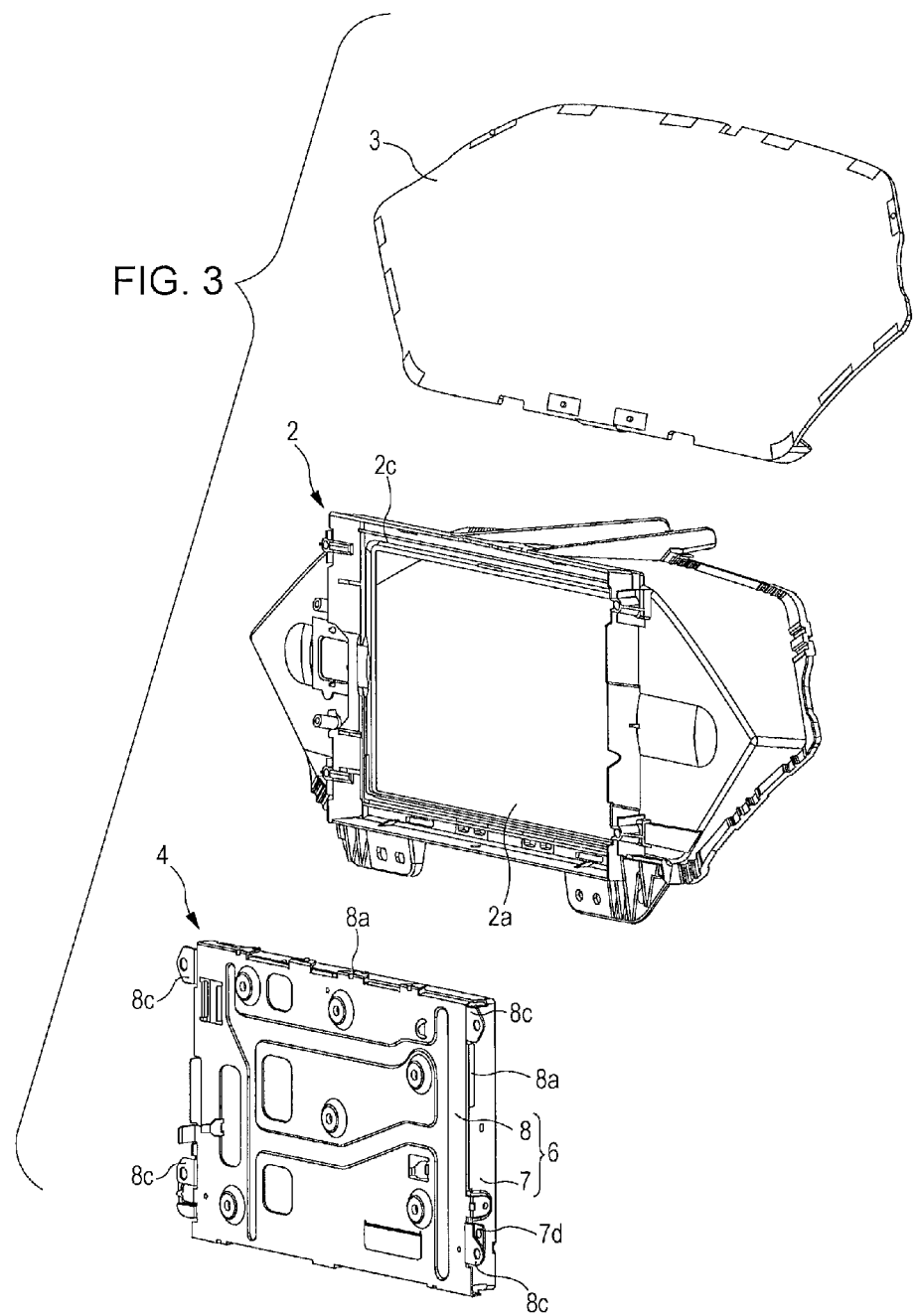
FIG. 3 is an exploded perspective view of the display device as seen from the rear.

An embodiment of the present invention will be described with reference to the drawings. A display device 1 to be mounted in a vehicle according to the present embodiment is to be used by being arranged in a cluster panel or the like in a vehicle cabin. As illustrated in FIG. 1 to FIG. 5, the display device 1 to be mounted in a vehicle mainly includes a case main body 2 that is made of a synthetic resin and in which a first opening 2a having a rectangular shape is formed, a cover 3 that is mounted on the case main body 2 and formed of a colored and transparent or colorless and transparent synthetic resin plate, and a display unit 4 that is mounted on the backside of the case main body 2. A liquid crystal panel 5 of the display unit 4 that will be described later is visible from the outside through the first opening 2a.

A shielding wall 2b projecting forward is integrally formed in a circumferential edge portion of the front surface of the case main body 2. A frame-shaped rib 2c is formed on the backside of the case main body 2 in such a manner as to surround the first opening 2a. A portion of the shielding wall 2b on the top surface side of the shielding wall 2b projects forward to a large extent in order to function as a visor, and the cover 3 is attached and fixed to an edge portion of the shielding wall 2b using a double-sided adhesive tape (not illustrated) or the like. As a result, a space in front of the first opening 2a is sealed with the cover 3.

The display unit 4 is an assembled structure in which the liquid crystal panel 5 having a rectangular parallelepiped shape is accommodated in a casing 6, and the casing 6 includes a front frame body 7 and a rear frame body 8. The liquid crystal panel 5 employs a driving method that is called an in-plane switching (IPS) method. This IPS method is a driving method of controlling the light intensity of a backlight by rotating liquid crystal molecules that are horizontally laid, and thus, the liquid crystal panel 5 employing the IPS method has advantages in that an inclination of liquid crystal molecules in the vertical direction will not occur, the viewing angle of the liquid crystal panel 5 is large, and the chromaticity changes and the color tone changes in the liquid crystal panel 5 are small.

Each of the front frame body 7 and the rear frame body 8 is a sheet-metal bracket that is manufactured by press-working a flat metal plate, and the front frame body 7 and the rear frame body 8 are to be joined and integrated with each other with the liquid crystal panel 5 sandwiched therebetween. As illustrated in FIG. 6 to FIG. 13, a second opening 7a that has a rectangular shape and through which a display area 5a of the liquid crystal panel 5 is to be exposed is formed in the front wall of the front frame body 7, and surrounding walls projecting rearward are bent and formed on four sides surrounding the front wall. Three protruding portions 7b each having a hemispherical shape are formed on the inner surface of the front wall of the front frame body 7, and positions at which these protruding portions 7b are formed are set to be the vertices of an isosceles triangle, the center of gravity of which substantially coincides with that of the liquid crystal panel 5 when viewed from the front. More specifically, a total of three protruding portions 7b are formed at three positions that surround the second opening 7a, the three positions including an upper center portion, a lower right portion, and a lower left portion of the inner surface of the front wall of the front frame body 7. In the surrounding walls of the front frame body 7, a protrusion 7c is formed on the inner surface of a side wall on the left when viewed from the front, two protrusions 7d are formed on right and left portions of the inner surface of a bottom wall, and an elastic member 9 made of a synthetic rubber is attached and fixed to a center portion of the inner surface of a top wall with a double-sided adhesive tape or the like. In addition, a plurality of mounting pieces 7f that project outward are formed at the four corners of the front frame body 7 on the surrounding walls, and a clearance hole 7e is formed in such a manner as to extend from the mounting piece 7f on the lower right side when viewed from the front to a corresponding one of the surrounding walls. Note that the protruding portions 7b, the protrusion 7c, and the protrusions 7d are simultaneously formed at the time of press-working the front frame body 7. The amounts of rearward protrusion of the three protruding portions 7b are set to be the same as one another, and also the amounts of upward protrusion of the two protrusions 7d are set to be the same as each other.

The rear frame body 8 includes a rear wall that is somewhat larger than the second opening 7a of the front frame body 7, and a plurality of through holes 8e are formed in the rear wall. A plurality of engagement walls 8a projecting forward are bent and formed in a circumferential edge portion of the rear wall of the rear frame body 8, and protrusions 8b are formed on the inner surfaces of the engagement walls 8a on the upper side and the lower side of the rear wall of the rear frame body 8. A plurality of mounting pieces 8c projecting outward are formed at the four corners of the rear wall of the rear frame body 8, and a supporting piece 8d projecting forward is bent and formed at the corner of the rear wall in the lower right when viewed from the front. An elastic member 11 that is made of a synthetic rubber is attached and fixed to the inner surface of the supporting piece 8d with a double-sided adhesive tape or the like, and in addition, elastic members 12 each of which is made of a synthetic rubber are attached and fixed at three positions on the inner surface of the rear wall of the rear frame body 8 with a double-sided adhesive tape or the like. As in the case of the protruding portions 7b of the front frame body 7, which have been described above, positions at which the elastic members 12 are arranged are set to be the vertices of an isosceles triangle the center of gravity of which substantially coincides with that of the liquid crystal panel 5 when viewed from the front. More specifically, each of the elastic members 12 are arranged in one of an upper center portion, a lower right portion, and a lower left portion of the inner surface of the rear wall of the rear frame body 8. Note that, as a material out of which the elastic members 12 are made, a piece of synthetic sponge made by foam-molding a synthetic resin such as polyurethane or the like, which is an example of a synthetic rubber that is silicon-based, urethane-based, or the like and that has a relatively high hardness, is suitable.

Work of assembling for the display unit 4 will be briefly described. First, the liquid crystal panel 5 is inserted into an area surrounded by the front frame body 7 from a rear end opening of the front frame body 7, and the outer edge portion of the front surface of the liquid crystal panel 5 is brought into contact with the protruding portions 7b. The left end surface of the liquid crystal panel 5 is brought into contact with the protrusion 7c, and the lower end surface of the liquid crystal panel 5 is brought into contact with the protrusions 7d. As a result, the display area 5a formed on the front surface of the liquid crystal panel 5 is exposed through the second opening 7a of the front frame body 7 and becomes visible. In this case, the top end surface of the liquid crystal panel 5 is brought into elastic contact with the elastic member 9, which has been attached and fixed to the inner surface of the top wall of the front frame body 7, and the lower end surface of the liquid crystal panel 5 is pressed into contact with the two protrusions 7d formed on the inner surface of the bottom wall of the front frame body 7 by a reaction force generated by the elastic contact between the top end surface of the liquid crystal panel 5 and the elastic member 9. Therefore, rattling of the liquid crystal panel 5 in a top-bottom direction with respect to the front frame body 7 is prevented (see FIG. 13).

After that, the engagement walls 8a of the rear frame body 8 are fitted to the outer surfaces of the surrounding walls of the front frame body 7 while the supporting piece 8d of the rear frame body 8 is inserted into the clearance hole 7e of the front frame body 7, so that each of the mounting pieces 7f of the front frame body 7 and a corresponding one of the mounting pieces 8c of the rear frame body 8 are superposed with each other, and the front frame body 7 and the rear frame body 8 are joined and integrated with each other in such a manner as to form the casing 6. As a result, the rear surface of the liquid crystal panel 5 is brought into elastic contact with the three elastic members 12, which have been attached and fixed to the inner surface of the rear wall of the rear frame body 8, and the outer edge portion of the front surface of the liquid crystal panel 5 is pressed into contact with the protruding portions 7b of the front frame body 7 by a reaction force generated by the elastic contact between the rear surface of the liquid crystal panel 5 and the elastic members 12. Therefore, the liquid crystal panel 5 is supported in the casing 6 at three points by the protruding portions 7b and the elastic members 12, each of the protruding portions 7b being paired with a corresponding one of the elastic members 12, so that rattling of the liquid crystal panel 5 in a front-rear direction (the thickness direction) in the casing 6 is prevented, and an air flow path is secured between the inner surface of the front frame body 7 and the circumferential edge portion of the liquid crystal panel 5 (see FIG. 10 and FIG. 13). In addition, the right end surface of the liquid crystal panel 5 is brought into elastic contact with the elastic member 11, which has been attached and fixed to the supporting piece 8d, and the left end surface of the liquid crystal panel 5 is pressed into contact with the protrusion 7c of the front frame body 7 by a reaction force generated by the elastic contact between the right end surface of the liquid crystal panel 5 and the elastic member 11. Thus, rattling of the liquid crystal panel 5 in a left-right direction with respect to the front frame body 7 is also prevented (see FIG. 10).

When the front frame body 7 and the rear frame body 8 are joined and integrated with each other by fitting the engagement walls 8a of the rear frame body 8 into the outer surfaces of the surrounding walls of the front frame body 7, the interior of the casing 6 and an external space are in communication with each other via the through holes 8e formed in the rear wall of the rear frame body 8, and in addition, since a space is defined between each of the engagement walls 8a, each of which having a corresponding one of the protrusions 8b, and the outer surface of the corresponding surrounding wall of the front frame body 7, the interior of the casing 6 and the external space are in communication with each other via the spaces. In other words, when the front frame body 7 and the rear frame body 8 are joined and integrated with each other with the liquid crystal panel 5 sandwiched therebetween, the spaces formed around the peripheries of the corresponding protrusions 8b and the through holes 8e that are formed in the rear frame body 8 in advance function as ventilation openings, and the second opening 7a formed in the front wall of the front frame body 7 and the external space outside the rear frame body 8 are in communication with each other via the above-described air flow path that is formed in the casing 6 and that is in communication with these ventilation openings.

Figure 4:
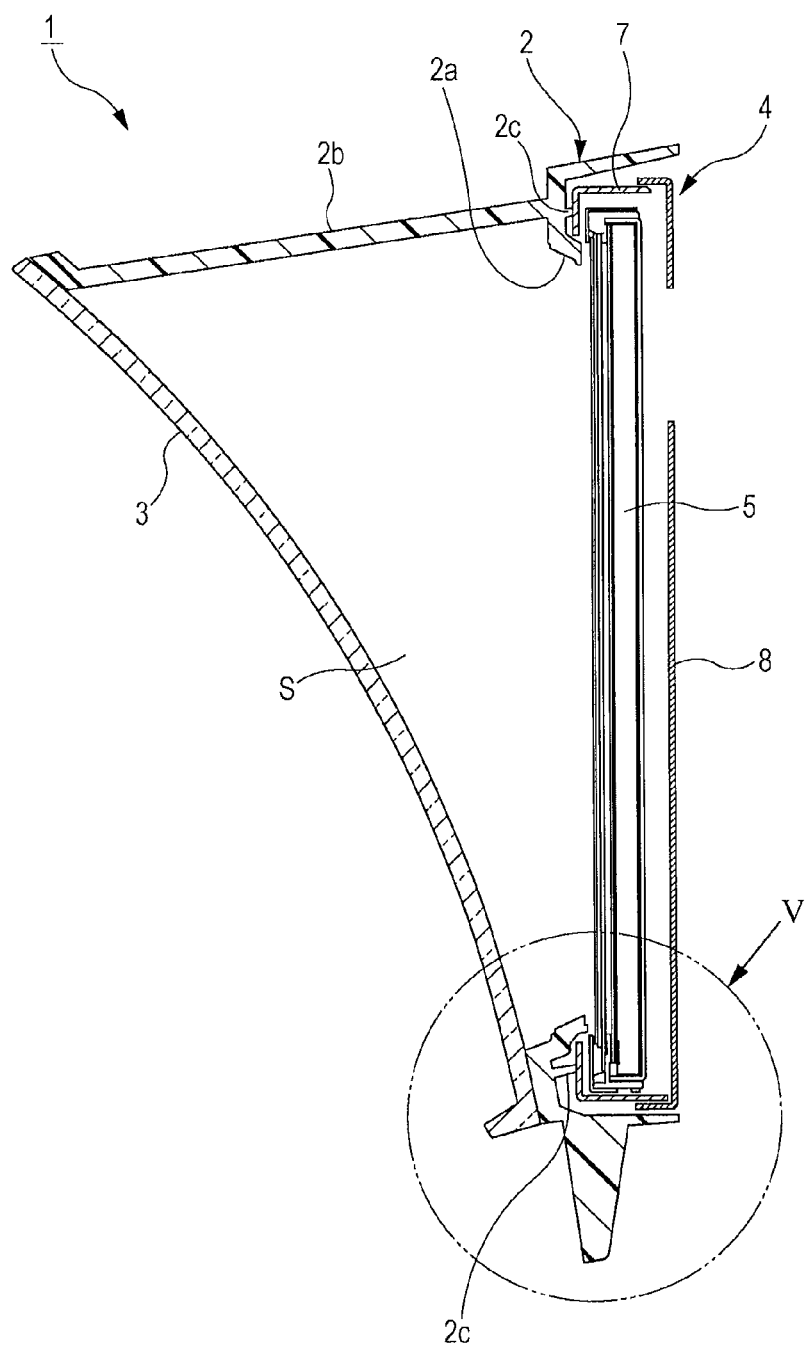
FIG. 4 is a cross-sectional view taken along line IV-IV of FIG. 1.
Figure 5:
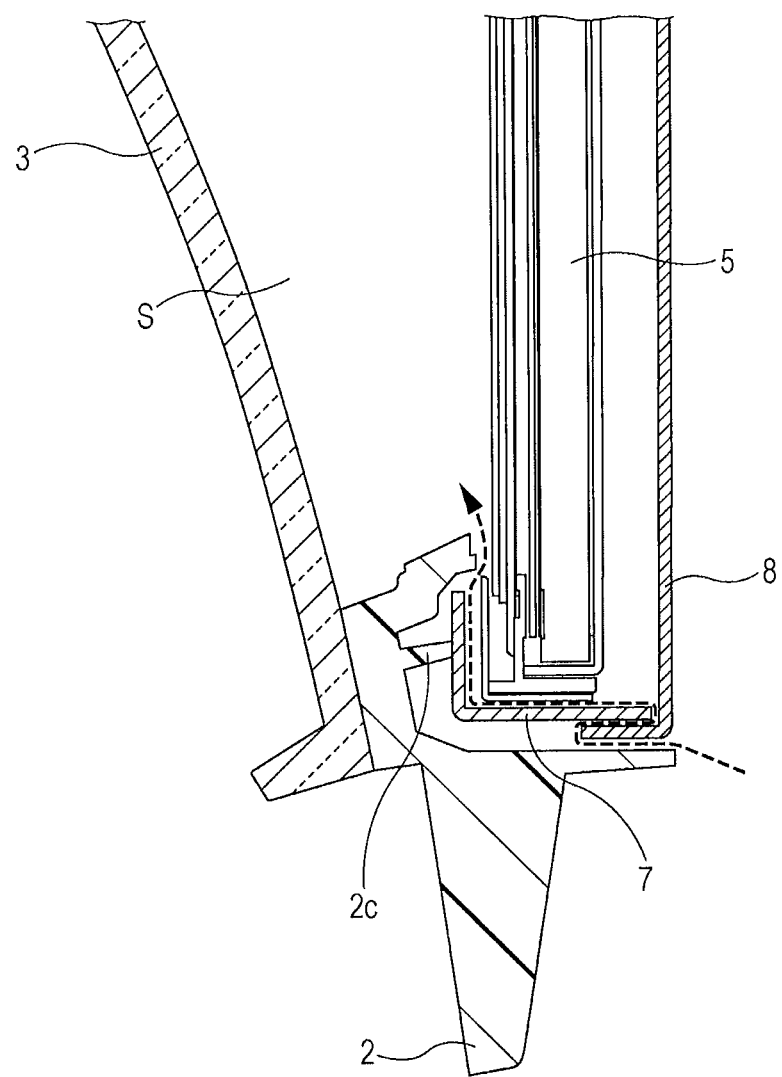
FIG. 5 is a detailed view of a portion V of FIG. 4.
Figure 6:
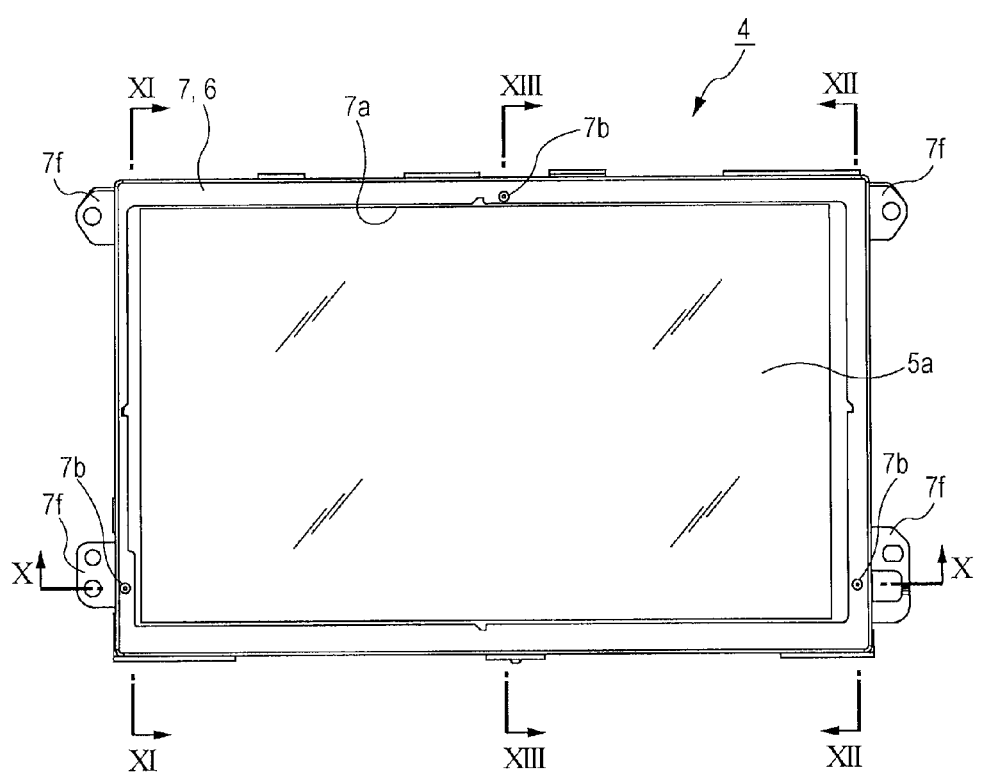
FIG. 6 is a front view of a display unit that is included in the display device.
Figure 7:
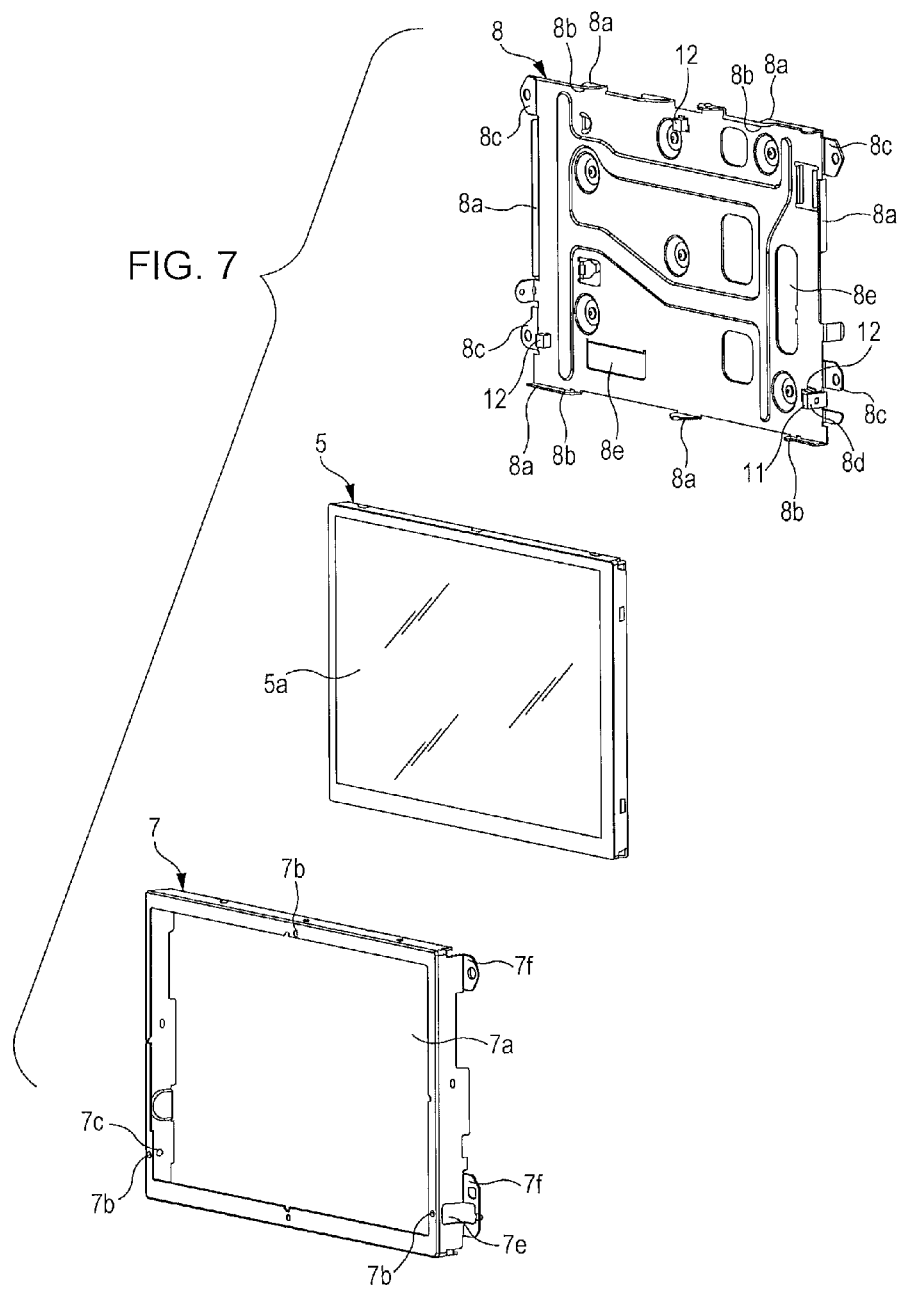
FIG. 7 is an exploded perspective view of the display unit as seen from the front.
Figure 8:
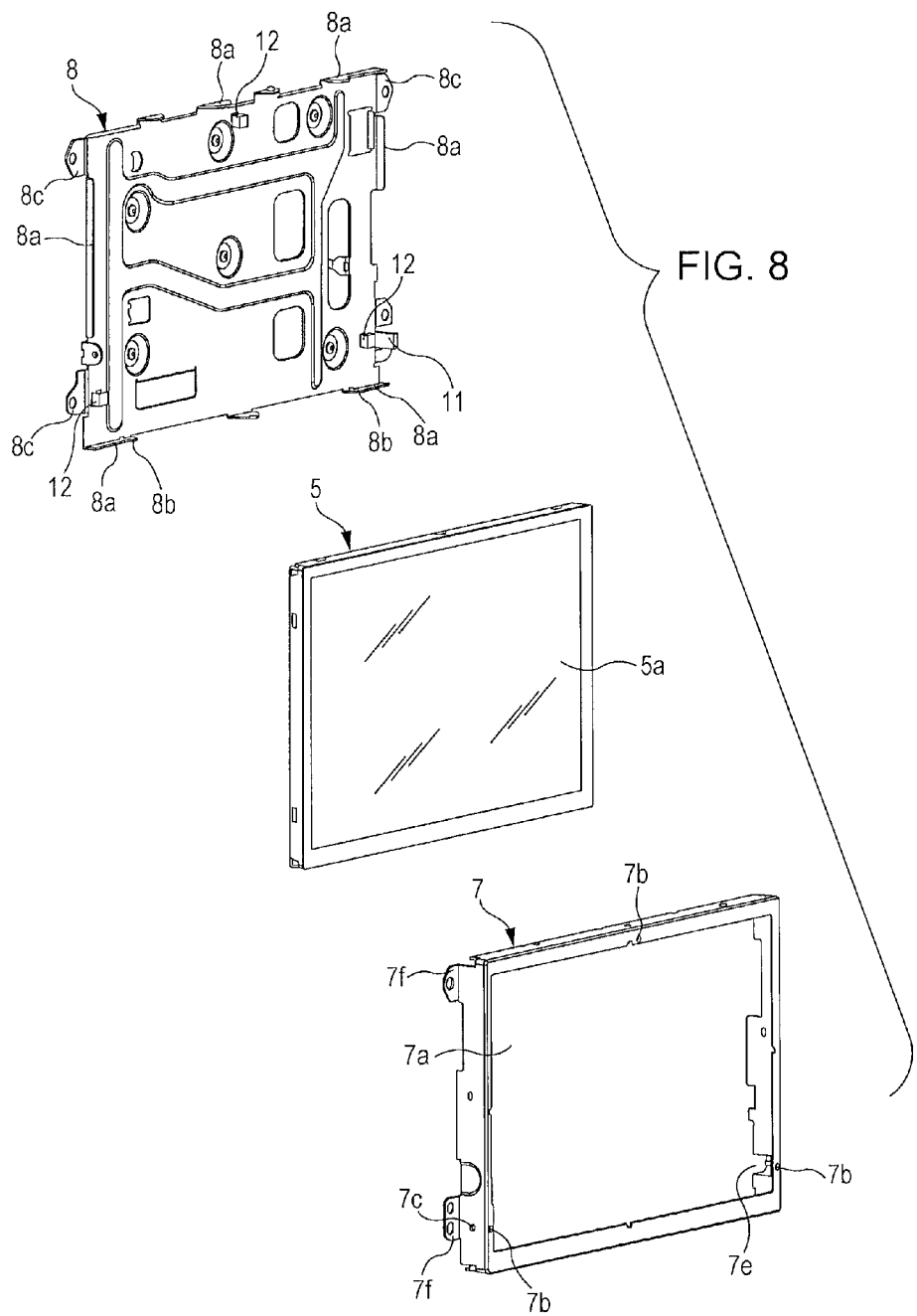
FIG. 8 is an exploded perspective view of the display unit as seen from the front in a direction different from that of FIG. 7.
Figure 9:
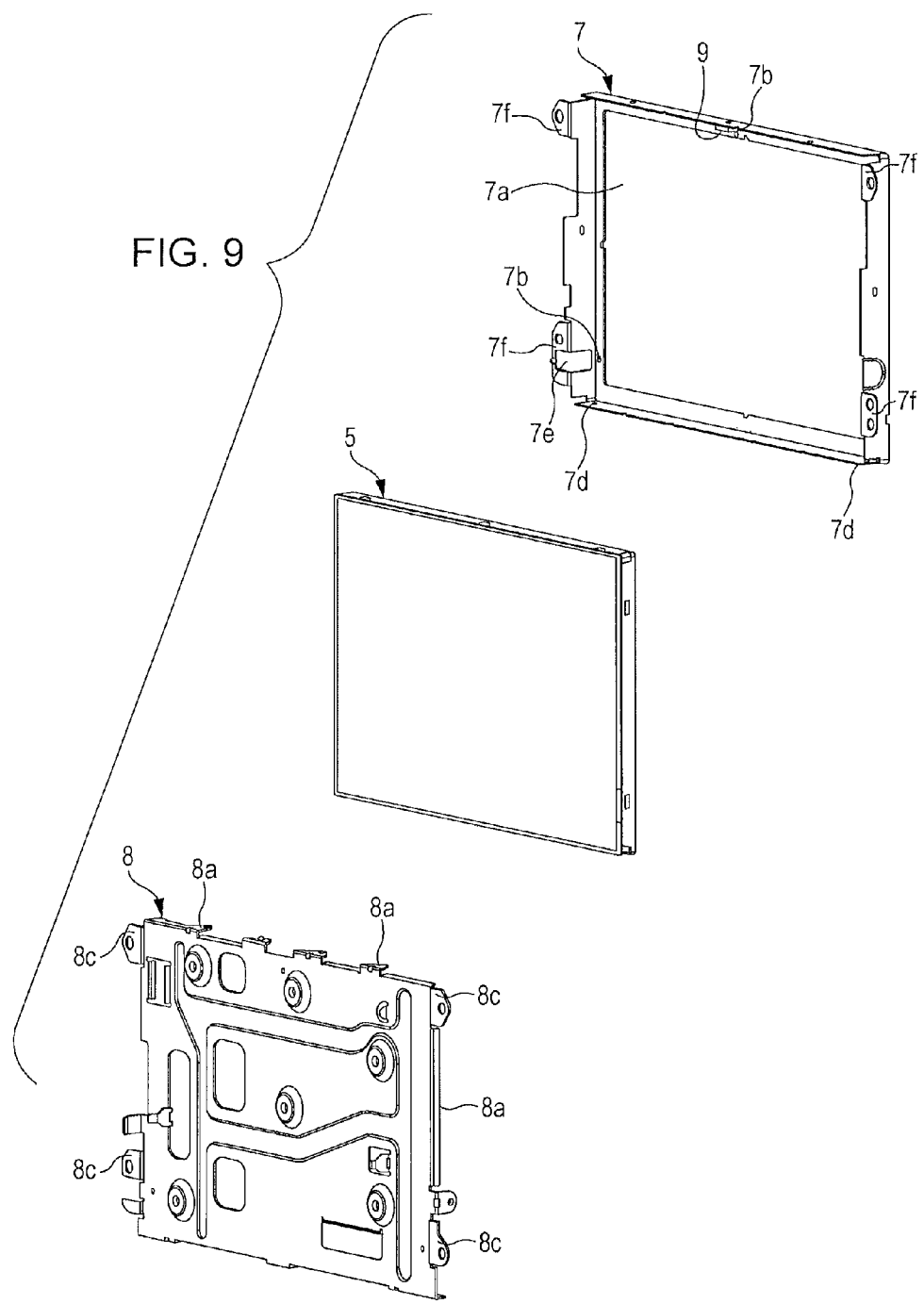
FIG. 9 is an exploded perspective view of the display unit as seen from the rear.
Figure 10:
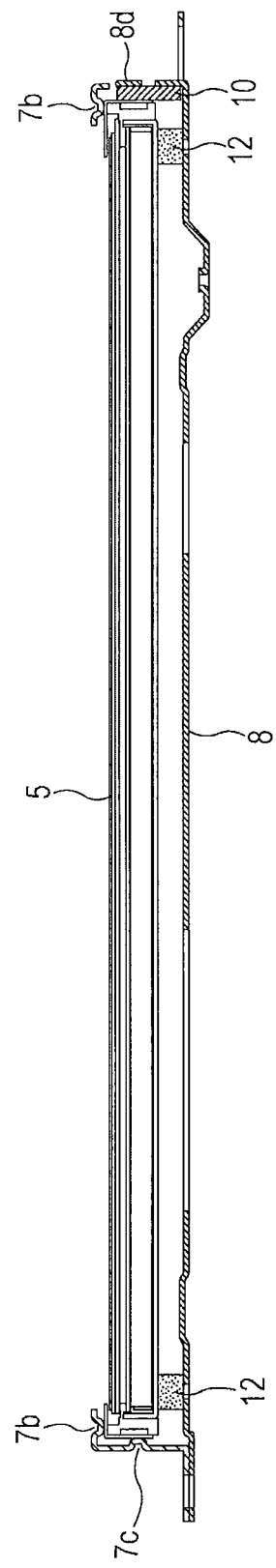
FIG. 10 is a sectional view taken along line X-X of FIG. 6.
Figure 11:
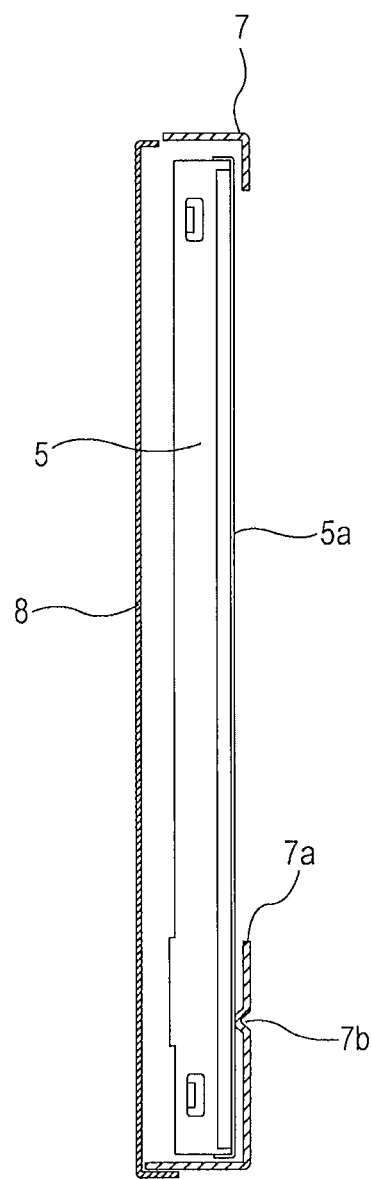
FIG. 11 is a cross-sectional view taken along line XI-XI of FIG. 6.
Figure 12:
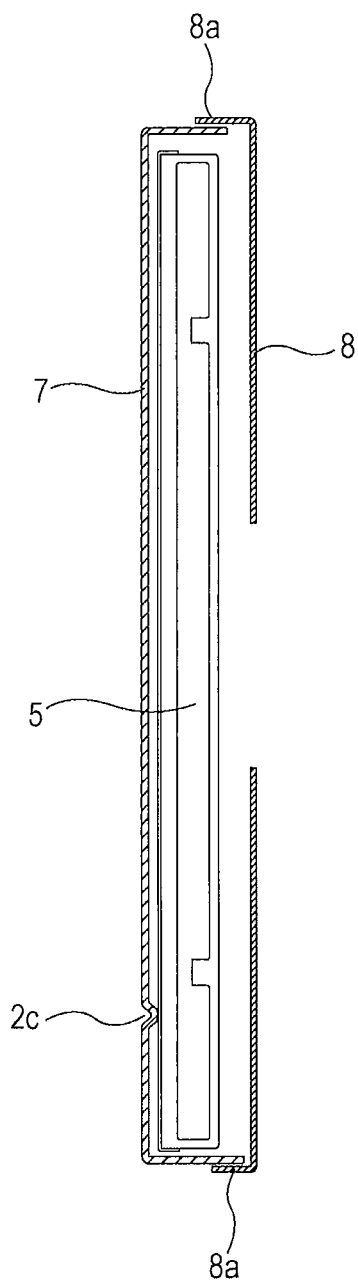
FIG. 12 is a cross-sectional view taken along line XII-XII of FIG. 6.
Figure 13:
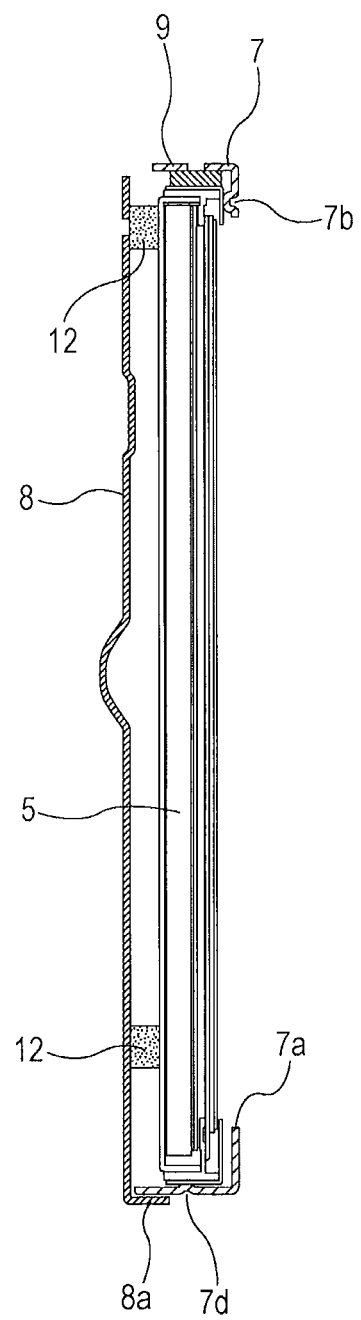
FIG. 13 is a cross-sectional view taken along line XIII-XIII of FIG. 6.

The display unit 4, which has been assembled in this manner, is mounted on the case main body 2 in a state where the outer surface of the front wall of the front frame body 7 is in close contact with the frame-shaped rib 2c of the case main body 2 by screwing the mounting pieces 7f of the front frame body 7 and the mounting pieces 8c of the rear frame body 8 into the backside of the case main body 2. As a result, as illustrated in FIG. 4, a large space S is secured between the cover 3, which has been attached and fixed to the shielding wall 2b of the case main body 2, and the display area 5a formed on the front surface of the liquid crystal panel 5, and a space outside the front frame body 7 and the space S are isolated from each other by the frame-shaped rib 2c.

Here, the display area 5a of the liquid crystal panel 5 is exposed through the second opening 7a facing the space S, and as described above, the second opening 7a and an external space outside the display unit 4 are in communication with each other via the air flow path defined between the inner surface of the front frame body 7 and the periphery of the liquid crystal panel 5. In other words, although the space S is closed by the frame-shaped rib 2c, the space S is not completely hermetically sealed and is in communication with the external space via the air flow path defined between the inner surface of the front frame body 7 and the periphery of the liquid crystal panel 5 and the ventilation openings of the rear frame body 8, and thus, as illustrated by an arrow (a dashed line) in FIG. 5, the air can pass through only the periphery of the liquid crystal panel 5 in the casing 6. Therefore, dust and the like can be prevented from entering the space S with certainty without adding a separate member such as a dust-proof sheet, and the air flows smoothly between the external space and the space S, so that a good anti-fogging effect can be realized.

In addition, the protrusion 7c is formed on the inner surface of one of a side wall of the front frame body 7, and the protrusions 7d are formed on the inner surface of the bottom wall of the front frame body 7. An air flow path is secured around the periphery of the liquid crystal panel 5 not only in the thickness direction but also in the in-plane direction by bringing a side end surface and a lower end surface of the liquid crystal panel 5 into contact with the protrusion 7c and the protrusions 7d, respectively, and thus, the air flows more smoothly between the external space and the space S. Furthermore, the outer edge portion of the front surface of the liquid crystal panel 5 is pressed into contact with the protruding portions 7b by the elastic members 12, the side end surface of the liquid crystal panel 5 is pressed into contact with the protrusion 7c by the elastic member 11, and the lower end surface of the liquid crystal panel 5 is pressed into contact with the protrusions 7d by the elastic member 9, so that the liquid crystal panel 5 is accommodated in the casing 6 without rattling in the front-rear direction (the thickness direction) and in the top-bottom and left-right directions (the in-plane directions), and generation of a rattling noise is suppressed, so that a noise reduction can be achieved.

The outer edge portion of the front surface of the liquid crystal panel 5 is supported in the casing 6 at three points by the pairs of the protruding portions 7b and the elastic members 12, and the three protruding portions 7b are formed on the inner surface of the front wall of the front frame body 7, which surrounds the second opening 7a. Therefore, in the case where a torsional stress is applied to the front frame body 7 and the rear frame body 8, which form the casing 6, the liquid crystal panel 5 is displaced along a straight line that connects two of the three protruding portions 7b as an axis. Therefore, even if a torsional stress is applied to the front frame body 7 and the rear frame body 8, the flatness of a virtual plane defined by three points that are the protruding portions 7b is maintained, and occurrence of deformation of the liquid crystal panel 5 can be prevented with certainty. In addition, the center of gravity of an isosceles triangle formed by connecting the top of each of the three protruding portions 7b and the center of gravity of the liquid crystal panel 5, which has a rectangular shape and which is accommodated in the casing 6, are set to substantially coincide with each other when viewed from the front. Therefore, even in the case where vibration in the front-rear direction is applied to the liquid crystal panel 5, a force that supports the liquid crystal panel 5 can be uniformly distributed at the protruding portions 7b, and a bending stress and a torsional stress that act on the liquid crystal panel 5 can be reduced with more certainty.

In particular, the liquid crystal panel 5, which employs the IPS method and which is used in the display device 1 to be mounted in a vehicle, has advantages in that the viewing angle thereof is large, and the chromaticity changes and the color tone changes in the liquid crystal panel 5 are small. On the other hand, the liquid crystal panel 5 has a drawback in that luminance unevenness (black unevenness) of a backlight is generated by a slight twisting force. However, the liquid crystal panel 5 employing the IPS method can be protected with certainty against an external stress, and thus, the front frame body 7 and the rear frame body 8 each of which is made of an inexpensive and lightweight sheet metal can be used as the casing 6 in which the liquid crystal panel 5 is to be accommodated. In contrast, in the case where a supporting structure in which the liquid crystal panel 5 is supported at three points by the front frame body 7 and the rear frame body 8 is not employed, the deformations of the front frame body 7 and the rear frame body 8 are transferred directly onto the liquid crystal panel 5 disposed in the casing 6. Thus, the front frame body 7 and the rear frame body 8 need to be made of a material having high rigidity such as die-cast aluminum or a hard resin. As a result, the component costs including the material costs and the costs of a metal mold significantly increase, and in addition, the total weight of the display unit 4 becomes large.

As described above, in the display device 1 to be mounted in a vehicle according to the present embodiment, the space S is secured between the cover 3 with which the first opening 2a of the case main body 2 is sealed and the liquid crystal panel 5 of the display unit 4 that is mounted on the backside of the case main body 2, the ventilation openings (the spaces around the peripheries of the protrusions 8b and the through holes 8e) that are in communication with the external space are formed in portions of the casing 6 of the display unit 4 except for the front surface of the casing 6, and a plurality of the protruding portions 7b each of which partially supports the outer edge portion of the front surface of the liquid crystal panel 5 are formed on the inner surface of the front wall of the casing 6. Therefore, a long and complicated air flow path extending from the front surface of the liquid crystal panel 5 to the periphery of the liquid crystal panel 5 is secured, and the space S and the external space are in communication with each other via the air flow path. Therefore, dust and the like can be prevented with certainty from entering the space S without adding a separate member such as a dustproof sheet, and the air flows smoothly between the external space and the space S, so that a good anti-fogging effect can be realized.

In addition, the elastic members 12 that cause the outer edge portion of the front surface of the liquid crystal panel 5 to be pressed into contact with the protruding portions 7b are arranged in the casing 6, and the rattling of the liquid crystal panel 5 in the casing 6 in the front-rear direction (the thickness direction) is prevented by the elastic members 12. Thus, noise reduction can be achieved.

The protrusion 7c that is in contact with the side end surface of the liquid crystal panel 5 is formed on the inner surface of the side wall of the casing 6, and a plurality of the protrusions 7d that are in contact with the lower end surface of the liquid crystal panel 5 are formed on the inner surface of the bottom wall of the casing 6. Thus, an air flow path is secured not only in the outer edge portion of the front surface of the liquid crystal panel 5, but also around the periphery of the liquid crystal panel 5 in the top-bottom and left-right directions, and the air can flow more smoothly between the external space and the space S.

In addition, the elastic member 9 and the elastic member 11 that cause the side end surface and the lower end surface of the liquid crystal panel 5 to be pressed into contact with their respective protrusion 7c and protrusions 7d are arranged in the casing 6, and thus, the liquid crystal panel 5 is accommodated in the casing 6 without rattling not only in the front-rear direction but also in the top-bottom and left-right directions (the in-plane directions), and noise reduction can be more effectively achieved.

The casing 6 is formed of an assembled structure formed of the front frame body 7 and the rear frame body 8 each of which is formed of a sheet-metal bracket, and the display unit 4 is assembled by joining and integrating the front frame body 7 and the rear frame body 8 with each other with the liquid crystal panel 5 sandwiched between the front frame body 7 and the rear frame body 8. Thus, the assembly work for the display unit 4 can be easily performed, and a reduction in the weight of the display unit 4 can be achieved by manufacturing the front frame body 7 and the rear frame body 8 at low cost.

In a state where the surrounding walls of the front frame body 7 project toward the back from the circumferential edge portion of the front wall of the front frame body 7, and the plurality of engagement walls 8a project toward the front from the circumferential edge portion of the rear wall of the rear frame body 8, when the engagement walls 8a are fitted to the outer surface of the front wall of the front frame body 7, the ventilation openings that allow communication between the interior of the casing 6 and the external space are secured at the positions where the engagement walls 8a and the outer surface of the front wall of the front frame body 7 are fitted to each other. More specifically, the protrusions 8b are formed on the inner surfaces of certain engagement walls among the engagement walls 8a, and the protrusions 8b are pressed into contact with the outer surfaces of the surrounding walls of the front frame body 7, so that spaces are secured between the engagement walls 8a, each of which includes the corresponding protrusion 8b, and the outer surfaces of the surrounding walls of the front frame body 7, and the interior of the casing 6 and the external space are in communication with each other via the spaces that function as ventilation openings. In the case of a configuration in which ventilation openings are secured at the positions where the front frame body 7 and the rear frame body 8 are fitted to each other when the display unit 4 is assembled by joining and integrating the front frame body 7 and the rear frame body 8 with each other as described above, a long and complicated air flow path can be defined between the external space and the space S. Note that the protrusions 8b may be formed on at least one of the engagement walls 8a of the rear frame body 8 and the outer surfaces of the surrounding walls of the front frame body 7, and protrusions may be formed on the outer surfaces of the surrounding walls of the front frame body 7 in place of the engagement walls 8a.

The above-described protruding portions 7b each having a hemispherical shape are formed at the three positions surrounding the second opening 7a of the front frame body 7, and the outer edge portion of the front surface of the liquid crystal panel 5 is supported at three points by the protruding portions 7b. Thus, even if a torsional stress is applied to the front frame body 7 and the rear frame body 8, the flatness of the virtual plane defined by the three points that are the protruding portions 7b is maintained, and occurrence of the deformation of the liquid crystal panel 5 can be prevented with certainty. In other words, even in the case where each of the front frame body 7 and the rear frame body 8 is formed of a bracket made of an inexpensive and lightweight sheet metal, the liquid crystal panel 5 can be protected with certainty against torsional deformations of the front frame body 7 and the rear frame body 8. Thus, the liquid crystal panel 5 employing the IPS method that has characteristics of a high display quality and not being resistant to a torsional stress can be used, and occurrence of the luminance unevenness (the black unevenness) of a backlight from being in the liquid crystal panel 5 employing the IPS method can be prevented with certainty.

Note that, in the above-described embodiment, the protruding portions 7b are formed at the three positions surrounding the second opening 7a of the front frame body 7, and the center of gravity of the isosceles triangle formed by connecting the top of each of the protruding portions 7b substantially coincides with the center of gravity of the liquid crystal panel 5 when viewed from the front. However, the positions at which the protruding portions 7b are formed are not limited to the three positions, and the protruding portions 7b may be formed at any three positions surrounding the second opening 7a.

In the above-described embodiment, all three protruding portions 7b are formed in the same shape, which is a hemispherical shape, and the outer edge portion of the front surface of the liquid crystal panel 5 is point-supported by the spherical surfaces of the protruding portions 7b each having a hemispherical shape. However, the three protruding portions 7b may be formed as protrusions or ridges each of which has a cone-like shape or a pyramid-like shape having a V-shaped cross section, or the protruding portions 7b having a hemispherical shape and the protruding portions 7b having a V-shaped cross section may be combined. Similarly, the shapes of the protrusion 7c and the protrusions 7d are not limited to a hemispherical shape.

Although the case where the liquid crystal panel 5 employing the IPS method is used as a display panel has been described in the above-described embodiment, a liquid crystal panel employing a twisted nematic (TN) method or a vertical alignment (VA) method may be used.

Although the case where the present invention is applied to a display device to be mounted in a vehicle has been described in the above-described embodiment, the present invention may also be applied to various other display devices such as transportable electronic devices.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display device comprising:
  a case main body in which a first opening is formed;
  a cover that is transparent and that is attached to the case main body in such a manner as to seal the first opening; and
  a display unit that is mounted on a backside of the case main body, the display unit including a rectangular display panel in which a display area of a front surface of the display panel faces the cover with a space interposed between the display area and the cover and a casing in which the display panel is accommodated and in which a second opening through which the display area is exposed is formed,
  wherein a ventilation opening that is in communication with an external space outside the display device is formed in a portion of the casing except for a front surface of the casing,
  wherein a plurality of protruding portions each of which partially supports an outer edge portion of the front surface of the display panel are formed on an inner surface of a front wall of the casing to protrude toward the front surface of the display panel, leaving other portions of the outer edge portion of the front surface of the display panel spaced apart from the inner surface of the front wall of the casing to form an air flow path, and
  wherein an outer surface of the front wall of the casing is in close contact with the backside of the case main body along the entire periphery of the second opening.

2. The display device according to claim 1,
  wherein an elastic member that causes the outer edge portion of the front surface of the display panel to be pressed into contact with the protruding portions is arranged in the casing.

3. The display device according to claim 1,
  wherein a protrusion that is in contact with a side end surface of the display panel is formed on an inner surface of a side wall of the casing, and
  wherein a plurality of protrusions that are in contact with a lower end surface of the display panel are formed on an inner surface of a bottom wall of the casing.

4. The display device according to claim 3,
  wherein elastic members that cause the side end surface and the lower end surface of the display panel to be pressed into contact with the corresponding protrusions are arranged in the casing.

5. The display device according to claim 1,
  wherein the casing includes a front frame body that includes a surrounding wall projecting rearward from a periphery of the front wall having the second opening and a rear frame body that closes a rear end opening of the front frame body, and
  wherein the front frame body and the rear frame body are joined with each other with the display panel sandwiched between the front frame body and the rear frame body.

6. The display device according to claim 5,
  wherein the ventilation opening is formed at a position at which the front frame body and the rear frame body are joined with each other.

7. The display device according to claim 6,
  wherein the rear frame body includes an engagement wall that is fitted to the surrounding wall of the front frame body, and
  wherein a protrusion that defines the ventilation opening is formed on at least one of the engagement wall and the surrounding wall of the front frame body.

8. The display device according to claim 5,
  wherein each of the front frame body and the rear frame body is a sheet-metal bracket that is made by bending a metal plate.

9. The display device according to claim 5,
  wherein the protruding portions are formed at three positions surrounding the second opening of the front frame body, and wherein the outer edge portion of the front surface of the display panel is supported at three points by the protruding portions.

10. The display device according to claim 9, wherein the display panel is a liquid crystal panel employing an in-plane switching (IPS) method.

11. A display device comprising:
a case main body having a transparent cover; and
a display unit that is mounted to the case main body, the display unit including a display panel in which a display area of a front surface of the display panel faces the cover with a space interposed between the display area and the cover and a casing in which the display panel is accommodated,
wherein a ventilation opening that is in communication with an external space outside the display device is formed in a portion of the casing except for a front surface of the casing,
wherein a plurality of protruding portions are disposed between an outer edge portion of the front surface of the display panel and an inner surface of a front wall of the casing, leaving other portions of the outer edge portion of the front surface of the display panel spaced apart from the inner surface of the front wall of the casing to form an air flow path, and
wherein an outer surface of the front wall of the casing is in close contact with the backside of the case main body.

12. The display device according to claim 11, wherein the front surface of the display panel is pressed into contact with the protruding portions by at least one elastic member arranged in the casing.

13. The display device according to claim 11, wherein a protrusion that is in contact with a side end surface of the display panel is formed on an inner surface of a side wall of the casing, and
wherein a plurality of protrusions that are in contact with a lower end surface of the display panel are formed on an inner surface of a bottom wall of the casing.

14. The display device according to claim 13, wherein elastic members that cause the side end surface and the lower end surface of the display panel to be pressed into contact with the corresponding protrusions are arranged in the casing.

15. The display device according to claim 11, wherein the casing includes a front frame body that includes a surrounding wall projecting rearward from a periphery of the front wall and a rear frame body that closes a rear end opening of the front frame body, and
wherein the front frame body and the rear frame body are joined with each other with the display panel sandwiched between the front frame body and the rear frame body.

16. The display device according to claim 15, wherein the ventilation opening is formed at a position at which the front frame body and the rear frame body are joined with each other.

17. The display device according to claim 16, wherein the rear frame body includes an engagement wall that is fitted to the surrounding wall of the front frame body, and
wherein a protrusion that defines the ventilation opening is formed on at least one of the engagement wall and the surrounding wall of the front frame body.

18. The display device according to claim 15, wherein each of the front frame body and the rear frame body is made by bending a metal plate.

19. The display device according to claim 15, wherein the protruding portions are formed at three positions around the front frame body, and
wherein the outer edge portion of the front surface of the display panel is supported at three points by the protruding portions.

20. The display device according to claim 19, wherein the display panel is a liquid crystal panel employing an in-plane switching (IPS) method.

* * * * *